United States Patent
Yamada et al.

(10) Patent No.: US 8,099,100 B2
(45) Date of Patent: Jan. 17, 2012

(54) COMMUNICATION CONTROL SYSTEM

(75) Inventors: Toshiyuki Yamada, Yokohama (JP);
Shunsuke Hidaka, Tokyo (JP); Shigeki Hirokawa, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 280 days.

(21) Appl. No.: 12/443,777

(22) PCT Filed: Oct. 2, 2007

(86) PCT No.: PCT/JP2007/069282
§ 371 (c)(1),
(2), (4) Date: Jun. 3, 2009

(87) PCT Pub. No.: WO2008/041699
PCT Pub. Date: Apr. 10, 2008

(65) Prior Publication Data
US 2010/0240381 A1    Sep. 23, 2010

(30) Foreign Application Priority Data
Oct. 3, 2006 (JP) .............................. P2006-271955

(51) Int. Cl.
*H04W 72/00* (2009.01)
(52) U.S. Cl. ...................................... 455/450; 455/452.1
(58) Field of Classification Search .................. 455/452, 455/518, 414.1, 902, 575.1, 509, 515, 550.1, 455/552.1, 569.1, 519, 416; 379/159; 704/235; 370/278
See application file for complete search history.

(56) References Cited

U.S. PATENT DOCUMENTS 6,240,069 B1 * 5/2001 Alperovich et al. .......... 370/260
7,289,816 B2 * 10/2007 Mills .............................. 455/458
(Continued)

FOREIGN PATENT DOCUMENTS
JP    2002 330459    11/2002
(Continued)

OTHER PUBLICATIONS

Iwashita, Mobile communication system and Mobile communication Method, Nov. 15, 2002, JP02002330459A, Abstract.*
(Continued)

*Primary Examiner* — Nick Corsaro
*Assistant Examiner* — Mahendra Patel
(74) *Attorney, Agent, or Firm* — Oblon, Spivak, McClelland, Maier & Neustadt, L.L.P.

(57) ABSTRACT

The present invention provides a communication control system which can prevent unnecessary communication connections while ensuring user-friendliness when 1 to N communication is performed.
The communication control system judges whether an area code of a mobile terminal and area codes of the other mobile terminals of the group match, and establishes 1 to N communication between the mobile terminal and the mobile terminals of which area codes match. As a result, when the users are contacted to meet, for example, the communication control system can prevent unnecessary communication connections without indiscriminately connecting the mobile terminals of users at distant locations for whom it is difficult to travel for a meeting. In addition, the communication destination mobile terminals are automatically selected based on the area code, user-friendliness can therefore be sufficiently ensured.

10 Claims, 10 Drawing Sheets

U.S. PATENT DOCUMENTS

| | | | |
|---|---|---|---|
| 7,801,953 B1 * | 9/2010 | Denman et al. | 709/204 |
| 7,873,378 B2 * | 1/2011 | Schliwa-Bertling et al. | 455/519 |
| 2002/0086676 A1 * | 7/2002 | Hendrey et al. | 455/445 |
| 2003/0060214 A1 * | 3/2003 | Hendrey et al. | 455/456 |
| 2005/0130680 A1 * | 6/2005 | Northcutt | 455/457 |
| 2005/0186970 A1 | 8/2005 | Yates et al. | |
| 2006/0063548 A1 | 3/2006 | Kim | |
| 2006/0116149 A1 | 6/2006 | Dunn et al. | |
| 2009/0017864 A1 * | 1/2009 | Keevill et al. | 455/552.1 |

FOREIGN PATENT DOCUMENTS

| | | | |
|---|---|---|---|
| JP | 2002330459 A * | 11/2002 | |
| JP | 2003-153322 | 5/2003 | |
| JP | 2003-333184 | 11/2003 | |
| JP | 2004 312694 | 11/2004 | |
| JP | 2004312694 A * | 11/2004 | |
| JP | 2006 81184 | 3/2006 | |
| WO | 99 66757 | 12/1999 | |

OTHER PUBLICATIONS

Kurato, Information Providing Server, Method, recording media and program, Nov. 4, 2004, JP02004312694A, Abstract.*

Yoshida, Naomasa et al., "System Developments of Push Talk Service", NTTDOCOMO Technical Journal, vol. 13, No. 4, pp. 6-13, 2006, (with English translation).

Office Action issued May 10, 2011, in Japanese Patent Application No. 2006-271955 (with English translation).

* cited by examiner

| AREA CODE | BASE STATION | BASE STATION ID |
|---|---|---|
| ⋮ | ⋮ | ⋮ |
| 22 | IKEBUKURO | 1111 |
| | MEJIRO | 1112 |
| | TAKADANOBABA | 1113 |
| | OHTSUKA | 1114 |
| ⋮ | ⋮ | ⋮ |
| 25 | SHIBUYA | 1211 |
| | YOYOGI | 1212 |
| | HARAJUKU | 1213 |
| | SHINJUKU | 1214 |
| ⋮ | ⋮ | ⋮ |

Fig.5
(a)
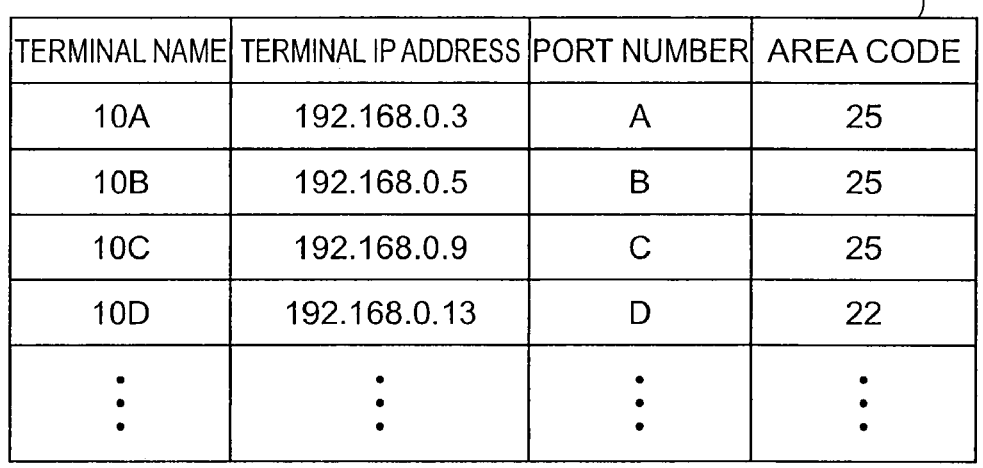
(b)
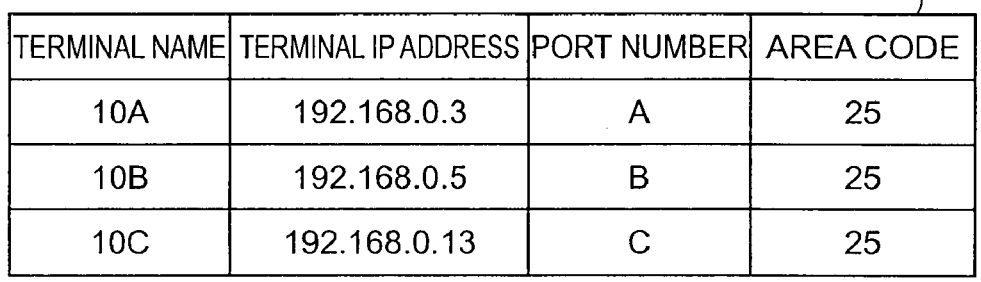

Fig.6
(a)
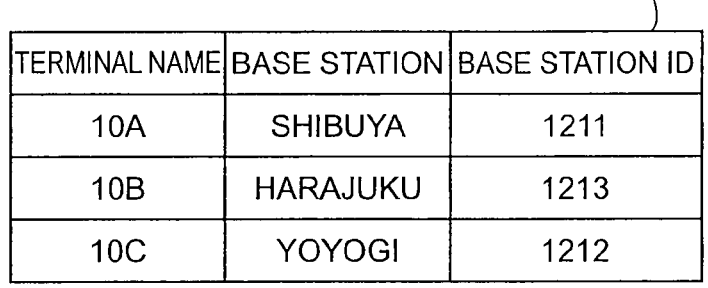
| TERMINAL NAME | BASE STATION | BASE STATION ID |
|---|---|---|
| 10A | SHIBUYA | 1211 |
| 10B | HARAJUKU | 1213 |
| 10C | YOYOGI | 1212 |
(b)
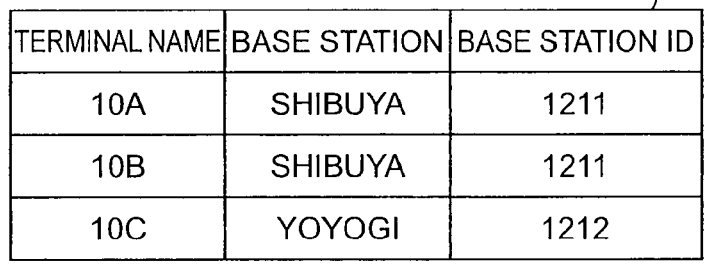
| TERMINAL NAME | BASE STATION | BASE STATION ID |
|---|---|---|
| 10A | SHIBUYA | 1211 |
| 10B | SHIBUYA | 1211 |
| 10C | YOYOGI | 1212 |
(c)
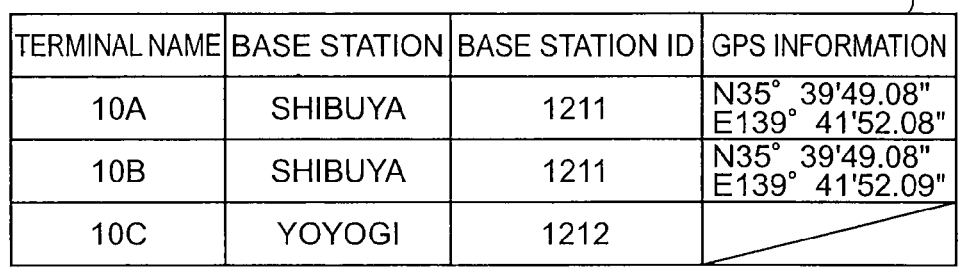
| TERMINAL NAME | BASE STATION | BASE STATION ID | GPS INFORMATION |
|---|---|---|---|
| 10A | SHIBUYA | 1211 | N35° 39'49.08"<br>E139° 41'52.08" |
| 10B | SHIBUYA | 1211 | N35° 39'49.08"<br>E139° 41'52.09" |
| 10C | YOYOGI | 1212 | |

COMMUNICATION CONTROL SYSTEM

TECHNICAL FIELD

The present invention relates to a communication control system that controls simultaneous communication among a plurality of mobile terminals belonging to a pre-registered group.

BACKGROUND ART

As a technology to implement new communication tools in the wake of voice communication using mobile terminals and TV telephone communication, a PoC (Push-to-Talk Over the Cellular) server, disclosed in Non-patent Document 1, for example, is known. A PoC server implements a 1 to N communication service, which allows simultaneous voice communication from a user of one mobile terminal, who presses the call button, to other users of a plurality of mobile terminals based on a packet exchange type best effort voice service.
Non-patent document 1: Naomasa Yoshida, Masaharu Nakagawa, Makoto Nakayama, Yohei Inokai, Miya Matsuda, Masanobu Yamagiwa: "System develop for push talk service", NTT DoCoMo Technical Journal, Vol. 13, No. 4, pp. 6 to 13, Jan. 1, 2006

DISCLOSURE OF THE INVENTION

Problem to be Solved by the Invention

In the case of the above mentioned communication service, a plurality of mobile terminals belonging to a pre-registered group, such as friends, a circle and coworkers, are connected for communication, and an example of possible use [of this communication service] is users contacting each other for the purpose of meeting. However, if all the mobile terminals of a group are indiscriminately connected for communication, including a mobile terminal of a user who is geographically distant and for whom it is difficult to travel for a meeting, wasteful processing is generated. On the other hand, if an individual user is requested to input mobile terminal information of users to be connected for communication before starting communication, operation of the user becomes complicated and ease of use is not ensured.

With solving these problems in view, it is an object of the present invention to provide a communication control system which can prevent unnecessary communication connections, while ensuring user-friendliness, when 1 to N communication is performed.

Means for Solving the Problem

To solve the above problem, a communication control system according to the present invention is a communication control system for controlling simultaneous communication among a plurality of mobile terminals belonging to a pre-registered group, comprising: position information storage means for storing position information which indicates a current position of each mobile terminal; start request information reception means for receiving start request information to request the start of a communication connection from one mobile terminal of the group; area judgment means for judging whether the other mobile terminals of the group are located within a predetermined area by referring to the position information stored in the position information storage means when the start request information reception means receives the start request information; and connection control means for establishing a communication connection between the one mobile terminal and the other mobile terminals which have been judged as being located within the predetermined area by the area judgment means.

In this communication control system, when a start request information is received from one mobile terminal, it is judged whether the other mobile terminals of the group are positioned within a predetermined area. Then 1 to N communication is established between the one mobile terminal and other mobile terminals located within the predetermined area. As a result, when the users are requested to meet, for example, the communication control system can prevent unnecessary communication connection without indiscriminately connecting the mobile terminals of users existing in distant locations for whom it is difficult to travel for a meeting. Mobile terminals which are connected for communication are automatically selected based on the position information, so user-friendliness can be sufficiently ensured.

It is preferable that the predetermined area is an area which is set with a current position of one mobile terminal as a center. In this case, 1 to N communication can be performed between one mobile terminal and other mobile terminals which are closer to the one mobile terminal.

It is also preferable that the predetermined area is an area which is set with a position specified by a user of the one mobile terminal as a center. In this case, a user who starts a communication connection can select an arbitrary location as the predetermined area, so communication destination mobile terminals can be more freely selected, and the convenience of communication service can be improved.

It is preferable that [the present invention] further comprises: position information monitoring means for monitoring position information of each mobile terminal during communication, and judging whether a current position of each mobile terminal mutually approaches within a predetermined distance; and approach information transmission means for transmitting the approach information to notify the mutual approach of the current position to the mobile terminal for which the position information monitoring means has judged that the current position has mutually approached within the predetermined distance. Then the user can intuitively recognize an approach of other users during communication, so the convenience of the communication service can be improved.

It is also preferable that [the present invention] further comprises: transmission request information reception means for receiving transmission request information to request the transmission of position information of one mobile terminal during communication to other mobile terminals during communication, from the one mobile terminal; and position information transmission means for transmitting the position information of the one mobile terminal to other mobile terminals when the transmission request information reception means receives the transmission request information. In this case, the user can notify its own current position to other users during communication, so the convenience of the communication service can be further improved.

It is also preferable that [the present invention] further comprises: receive request information reception means for receiving receive request information to request the reception of position information of other mobile terminals during communication from one mobile terminal during communication, and position information transmission means for transmitting the position information of other mobile terminals to the one mobile terminal when the receive request information reception means receives the receive request information. In this case, the user can know the current positions of other users during communication, so the convenience of the communication service can be improved.

Effect of the Invention

With the communication control system according to the present invention, unnecessary communication connections can be prevented while ensuring user-friendliness when 1 to N communication is performed.

BRIEF DESCRIPTION OF THE DRAWINGS

FIG. 4 is an example of a reference table stored in an area code server;

FIG. 5 are examples of a judgment table created by a judgment unit;

FIG. 6 are examples of a monitoring table created by a position information monitoring unit;

EXPLANATION OF REFERENCE NUMERALS

1 Communication control system
10 Mobile terminal
10A One mobile terminal
10B to 10D Other mobile terminals
20 Dedicated packet data processing device
40 Area code server (position information storage means)
211 Start request reception unit (start request reception means)
214 Area judgment unit (area judgment means)
215 Communication control unit (connection control means)
221 Position information monitoring unit (position information monitoring means)
222 Approach information transmission unit (approach information transmission means)
223 Position information transmission/reception request reception unit (transmission request information receive means, reception request information reception means)
255 Position information transmission unit (position information transmission means)

BEST MODE FOR CARRYING OUT THE INVENTION

Preferred embodiment of the communication control system according to the present invention will now be described with reference to the drawings.

First an outline of the communication service provided to users by the communication control system according to an embodiment of the present invention will now be described with reference to FIG. 1.

This communication service is a 1 to N communication service which allows to perform simultaneous voice communication from a user of one mobile terminal to users of a plurality of mobile terminals via a packet exchange type best effort voice service. As FIG. 1 shows, a plurality of groups, such as friends, a circle and coworkers have been registered in advance in a mobile terminal 10 (10A) of one user (user A).

Figure 1:
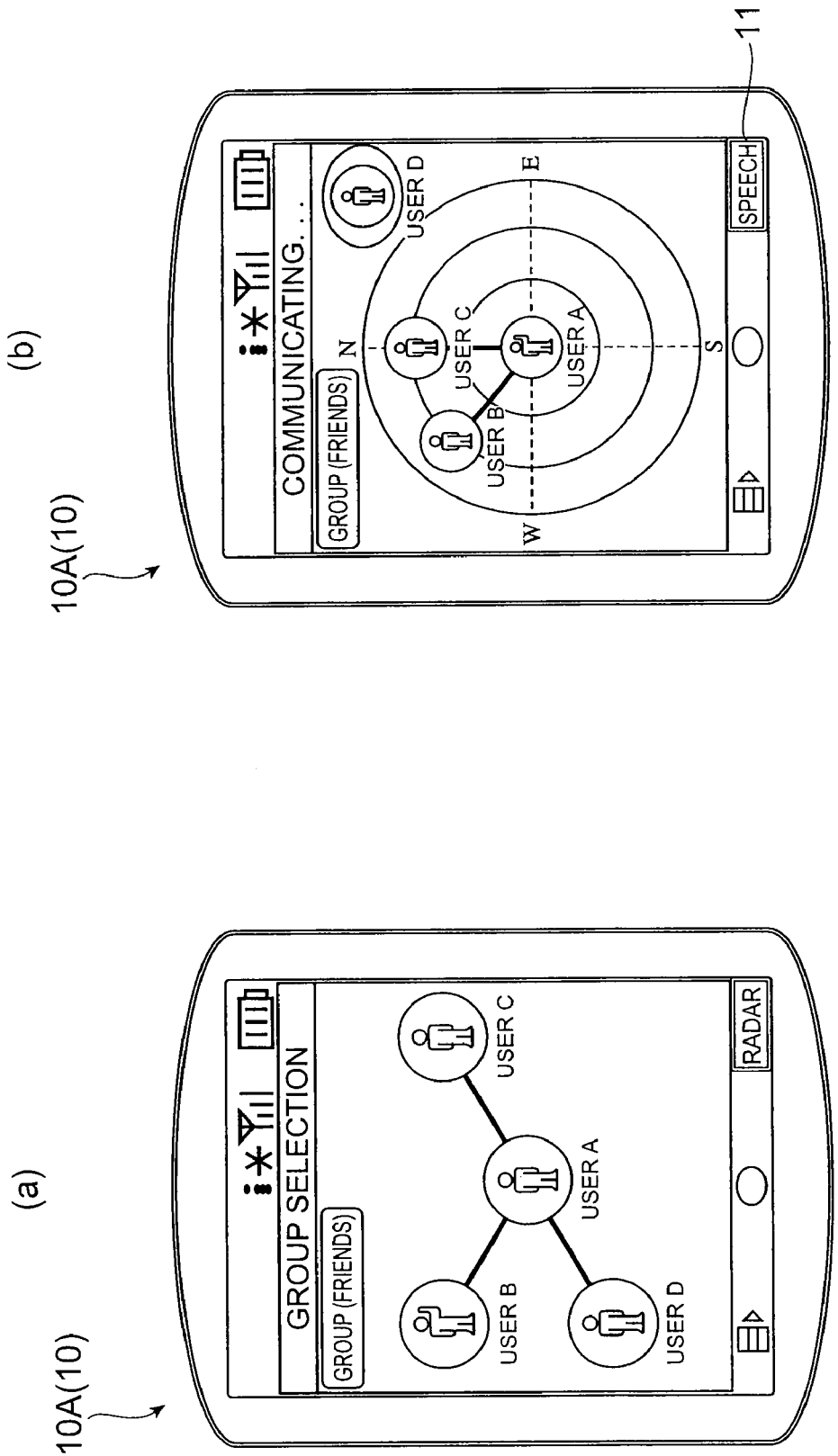
FIG. 1 are diagrams depicting an outline of a communication service implemented by a communication control system according to an embodiment of the present invention.

When user A wants to meet friends at a certain place, for example, the user selects a group (friends), then icons of a plurality (three in this case) of users (user B to user D) are displayed on the display of the mobile terminal 10A, with the icon of user A at the center as shown in (a) of FIG. 1. When user A performs an operation to start communication, a communication connection is established with the mobile terminals 10B and 10C of the users (user B and user C) located at positions close to the current position of user A.

After the communication connection is established, the general current locations of user B and user C are displayed on the display of the mobile terminal 10A of user A via radar, with the current position of user A at the center as shown in (b) of FIG. 1. The icon of user D, with whom a communication connection was not established because [user D] is located distant from the current position of user A, is displayed outside the radar display. By pressing the "speech" button 11 displayed at the lower part of the display of the mobile terminal 10A, user A can acquire the speech right to user B and user C. If user A speak via a speaker (not illustrated) of mobile terminal 10A after acquiring the speech right, the voice data is sent to the mobile terminals 10B and 10C.

Now the communication control system to implement the above mentioned communication service will be described.

Figure 2:
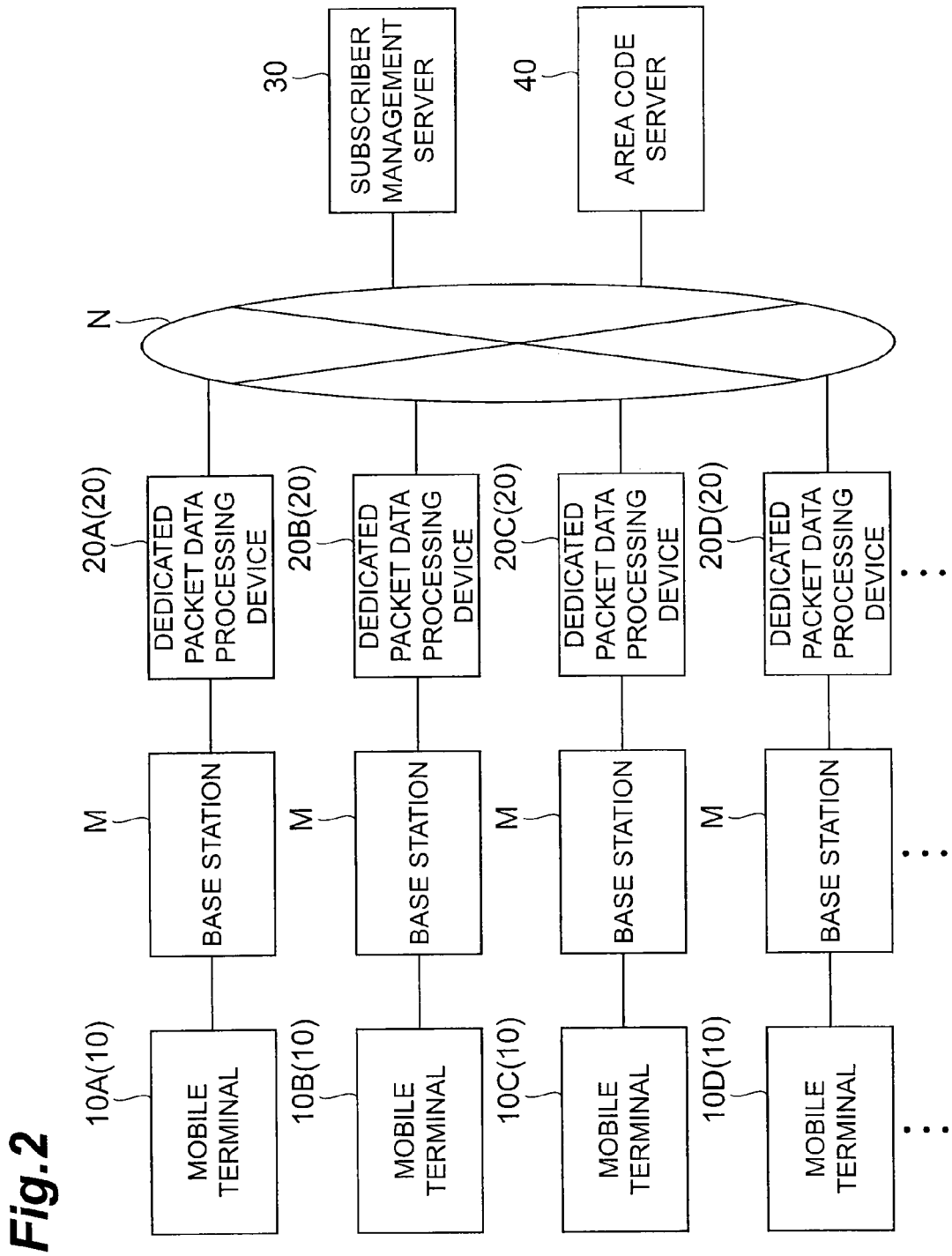
FIG. 2 is a diagram depicting a functional configuration of the communication control system according to an embodiment of the present invention.

FIG. 2 is a diagram depicting a configuration of a communication control system according to an embodiment of the present invention. As FIG. 2 shows, the communication control system 1 comprises mobile terminals 10 (10A, 10B, 10C, . . . ) owned by each user who joined the communication service, dedicated packet data processing devices 20 (20A, 20B, 20C, . . . ) installed in each base station M, a subscriber management server 30, and an area code server (position information storage means) 40. Each mobile terminal 10 is connected to the respective dedicated packet data processing device 20 so that information can be mutually communicated via the base station M [where each mobile terminal 10 is located]. Each dedicated packet data processing device 20 is connected to the subscriber management server 30 and the area code server 40 via a mobile telephone communication network N, so that information can be mutually communicated. Each composing element will now be described.

The mobile terminal 10 physically comprises a CPU (Central Processing Unit), a storage device, such as a memory, an input device, such as push buttons, and a display device, such as a display. In addition to normal call functions, [the mobile terminal 10] also has a function to connect to and read WEB pages, and various data communication functions including an electronic mail transmission function, and a GPS (Global Positioning System) function to receive GPS information to indicate one's current latitude and longitude from a GPS.

When a user selects a group with which communication the user desires, this mobile terminal 10 performs a predetermined operation, and transmits start request information to request the start of a communication connection, and terminal specification information to specify the mobile terminals 10 of the users belonging to the selected group, to the dedicated packet data processing device 20. When the communication connection with other mobile terminals 10 completes according to the transmitted start request information and terminal specification information, the mobile terminal 10 receives a connection completion notice from the dedicated packet data processing device 20. Then on the display of each mobile terminal 10, the current positions of other users are displayed via radar with the current position of the user of this mobile terminal 10 as the center (see FIG. 1).

The mobile terminal 10 during communication can acquire a voice data transmission right (speech right) to the mobile terminals 10 of other users by pressing the speech button. The mobile terminal 10 which acquired the speech right sends voice data based on the voice, which is input by the user, to the dedicated packet data processing device 20. When the GPS transmission request information to request transmission of the GPS information from the dedicated packet data processing device 20 is received, the mobile terminal 10 receives the GPS information from the GPS (not illustrated), and transmits it to the dedicated packet data processing device 20.

The mobile terminal 10 also transmits GPS information transmission request information, to request transmission of the GPS information to other mobile terminals 10, to the dedicated packet data processing device 20, and transmits the GPS information to other mobile terminals 10 during communication via a predetermined operation of the user. Also [the mobile terminal 10] transmits GPS information reception request information, to request reception of GPS information from other mobile terminals 10, to the dedicated packet data processing device 20 via predetermined operation of the user. Further, according to the transmission of the GPS information reception request information, [the mobile terminal 10] receives the GPS information which is transmitted from other mobile terminals 10.

The subscriber management server 30 is a server to manage the subscriber information of the mobile terminals 10 belonging to the mobile telephone communication network N, and is physically a computer system comprising: a CPU, a memory, a communication interface, a storage unit, such as a hard disk, and a display unit, such as a display. When the later mentioned base station ID transmission request information and terminal specification information from the dedicated packet data processing device 20 are received, the subscriber management server 30 transmits a base station ID of a base station, where each mobile terminal 10 specified by the terminal specification information is located, to the dedicated packet data processing device 20.

The area code server 40 is physically a computer system comprising: a CPU, a memory, a communication interface, a storage unit, such as a hard disk, and a display unit, such as a display, just like the case of the subscriber management server 30. The area code server 40 stores a reference table 50 in which a base station ID and an area code are correlated. FIG. 4 shows an example of the reference tale. In the example shown in FIG. 4, four base station IDs are assigned to one area code.

For example, each base station ID of "Ikebukuro: ID 1111", "Meijiro: ID 1112", "Takadanobaba: ID 1113" and "Ohtsuka: ID 1114" is assigned to area code "22". Also each base station ID of "Shibuya: ID 1211", "Yoyogi: ID 1212", "Harajuku: ID 1213" and "Shinjuku: ID 1214" is assigned to area code "25". When area code transmission request information to request the transmission of an area code and a base station ID are received from the dedicated packet data processing device 20, the area code server 40 transmits an area code corresponding to the received base station ID to the dedicated packet data processing device 20.

Figure 3:
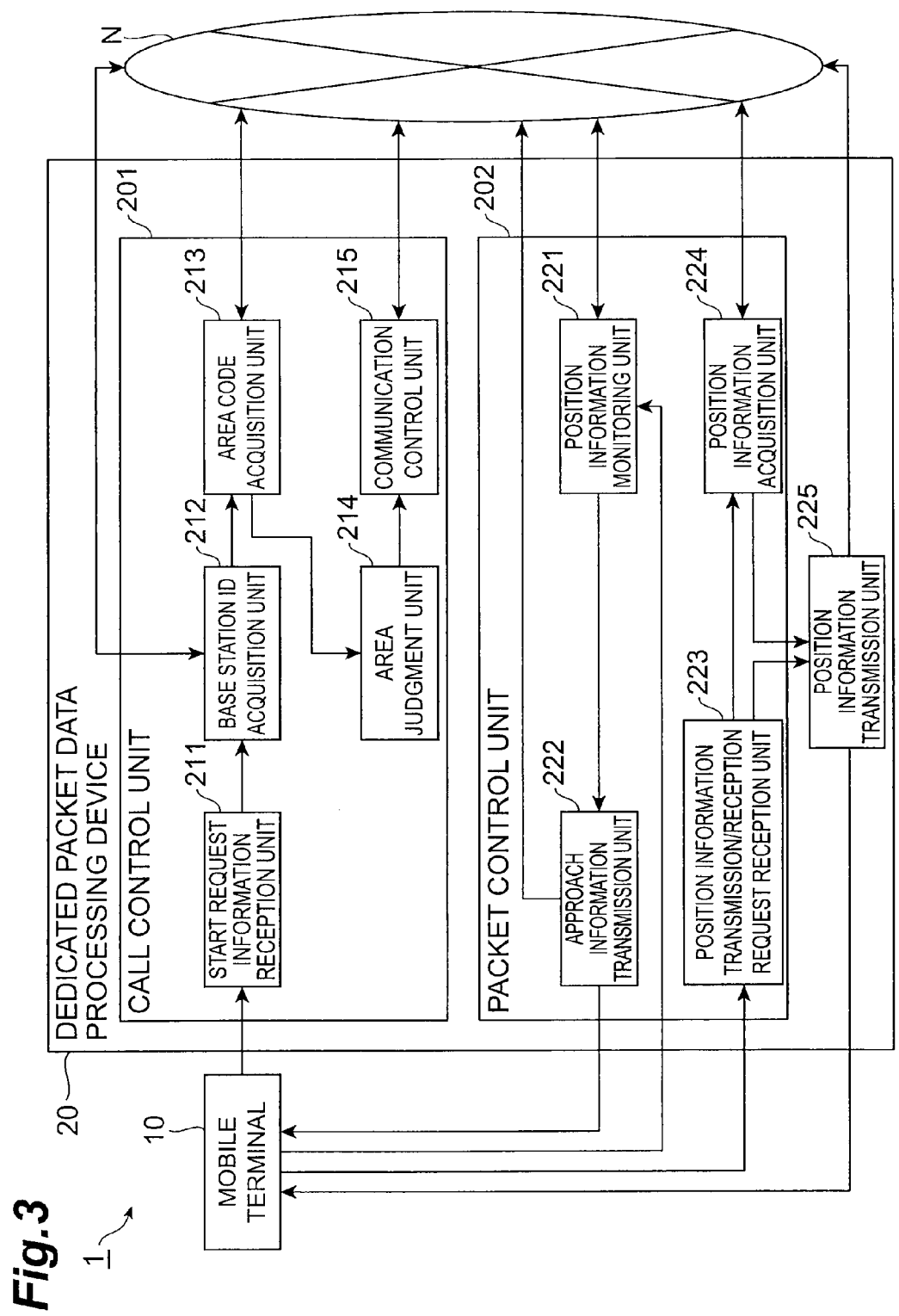
FIG. 3 is a diagram depicting a functional configuration of a dedicated packet data processing device.

The dedicated packet data processing device 20 is a device managed by a service provider who provides a communication service, and is physically a computer system comprising: a CPU, a memory, a communication interface, a storage unit, such as a hard disk, and a display unit, such as a display. This dedicated packet data processing device 20 has a call control unit 201 and a packet control unit 202 as functional composing elements, as shown in FIG. 3.

The call control unit 201 is a portion to mainly perform processing to establish a communication connection between mobile terminal devices 10 and 10, and comprises: a start request information reception unit (start request information reception means) 211, a base station ID acquisition unit 212, an area code acquisition unit 213, an are judgment unit (area judgment means) 214, and a communication control unit (communication control means) 215. The start request information reception unit 211 is a portion to receive the start request information and terminal specification information from the mobile terminal 10. The start request information reception unit 211 outputs each received information to the base station ID acquisition unit 212.

The base station ID acquisition unit 212 is a portion to acquire a base station ID of a base station M where the mobile terminal 10 is located. Specifically, when the start request information and terminal specification information are received from the start request information reception unit 211, the base station ID acquisition unit 212 transmits a terminal IP address transmission request to request the transmission of a terminal IP address, to the mobile terminals 10A to 10D specified by the terminal specification information. The base station ID acquisition unit 212 receives the terminal ID addresses transmitted from the mobile terminals 10A to 10D according to the transmission of the terminal IP address transmission request information.

Then the base station ID acquisition unit 212 transmits the terminal specification information and the base station ID transmission request information to request the transmission of and a base station ID of a base station M where each mobile terminal 10A to 10D is located, to the subscriber management server 30. When the base station ID is received from the subscriber management server 30 according to the transmission of the base station ID transmission request information, the base station ID acquisition unit 212 outputs the terminal IP address, base station ID and terminal specification information to the area code acquisition unit 213.

The area code acquisition unit 213 is a portion to acquire an area code of a mobile terminal 10. When a terminal IP address and a base station ID are received from the base station ID acquisition unit 212, the area code acquisition unit 213 transmits area code transmission request information, along with the base station ID, to the area code server 40. Then the area code acquisition unit 213 receives an area code, transmitted from the area code server 40, and outputs the area code, terminal IP address and terminal specification information to the area judgment unit 214.

The area judgment unit 214 is a portion to judge whether a communication destination mobile terminal 10 is located within a predetermined area. Specifically, when an area code, terminal IP address and terminal specification information are received from the area acquisition unit 213, the area judgment unit 214 creates a judgment table in which this information is correlated. (a) of FIG. 5 shows an example of the judgment table. In the case of the example in (a) of FIG. 5, terminal names "10A/10B/10C/10D/ . . . ", terminal IP addresses "192.168.0.3/192.168.0.5/192.168.0.9/192.168. 0.

13/ . . . ", port numbers "A/B/C/D/ . . . " and area codes "25/25/25/22/ . . . " are correlated and stored in a judgment table 51.

After creating the judgment table, the area judgment unit 214 judges whether an area code, which matches with an area code of a mobile terminal 10A which transmitted the start request information, exists. Then as (b) of FIG. 5 shows, the area judgment unit 214 deletes each information of the mobile terminal 10D, of which area code does not match the area code of the mobile terminal 10A, from the judgment table, and extracts only each information of the mobile terminals 10B and 10C of which area codes match with the area code of the mobile terminal 10A. Then the area judgment unit 214 outputs the judgment table to the communication control unit 215.

The communication control unit 215 is a portion to control the communication connection between mobile terminals 10 and 10. When the judgment table is received from the area judgment unit 214, the communication control unit 215 transmits start information to start the communication connection to the mobile terminals 10B and 10C. Then [the communication control unit 215] establishes the communication connection between the mobile terminal 10A and the mobile terminals 10B and 10C of which area codes match the area code of the mobile terminal 10A.

The packet control unit 202 is a portion to control packet data, which is exchanged after a communication connection is established, and to control the speech right of the user. The packet control unit 202 comprises a position information monitoring unit (position information monitoring means) 221, approach information transmission unit (approach information transmission means) 222, position information transmission/reception request reception unit (transmission request information reception means, receive request information reception means) 223, position information acquisition unit 224 and position information transmission unit (position information transmission means) 225.

The position information monitoring unit 221 is a portion to monitor the position information of communication terminals 10 and 10 during communication. Specifically, after the communication connection is established between a mobile terminal 10A and mobile terminals 10B and 10C, the position information monitoring unit 221 transmits terminal specification information of the mobile terminals 10A to 10C during communication to the subscriber management server 30. Then [the position information monitoring unit 221] receives the base station IDs of the mobile terminals 10A to 10C which are transmitted from the subscriber management server 30 according to the transmission of the terminal specification information, and creates a monitoring table in which the base station ID and terminal name are correlated. The terminal specification information is repeatedly transmitted every several seconds, for example, while the mobile terminals 10A to 10C are in communication, whereby the base station IDs stored in the monitoring table are sequentially updated.

(a) of FIG. 5 shows an example of a monitoring table. In the case of the example shown in (a) of FIG. 5, terminal names currently in communication "10A/10B/10C", base stations "Shibuya/Harajuku/Yoyogi" and base station IDs "1211/1213/1212" are stored in the monitoring table 52. When the information stored in the monitoring table 52 is updated in this state, it is assumed that, as shown in (b) of FIG. 5, for example, the base station where the mobile terminal 10B is located changes from "Harajuku" to "Shibuya", and the base station ID thereof changes from "1213" to "1211" accordingly. Then the position information monitoring unit 221 transmits GPS transmission request information to request the transmission of the GPS information, which indicates the longitude and latitude of the current position, to the mobile terminal 10A and the mobile terminal 10 B of which base station IDs match.

When the GPS information, transmitted from the mobile terminal 10A and the mobile terminal 10B, is received according to the transmission of the GPS transmission request information, the position information monitoring unit 221 adds the GPS information to the monitoring table 52, as shown in (c) of FIG. 5. In the case of the example shown in (c) of FIG. 5, the GPS information "N35° 39' 49.08"/E139° 41' 52.08"" on the mobile terminal 10A and the GPS information "N35° 39' 49.08"/E139° 41' 52.09" on the mobile terminal 10B are added to the monitoring table 52.

Based on the acquired GPS information, the position information monitoring unit 221 judges whether the current positions of the mobile terminal 10A and the mobile terminal 10B approach within a predetermined distance (e.g. 50 m). Then the position information monitoring unit 221 outputs the judgment result information to show the judgment result to the approach information transmission unit 222.

The approach information transmission unit 222 is a portion to transmit the approach information to mobile terminals 10 and 10 based on the judgment result information received from the position information monitoring unit 221. More specifically, the approach information transmission unit does not perform any special processing if the judgment result information that indicates that the current positions of a mobile terminal 10A and a mobile terminal 10B are mutually apart more than a predetermined distance, but if the judgment result information, that indicates that the current positions of the mobile terminal 10A and mobile terminal 10B mutually approach within a predetermined distance, the approach information transmission unit 222 transmits the approach information to both the mobile terminal 10A and the mobile terminal 10B. The approach information can be message information, such as "user OO is approaching", or may be instruction information to have the mobile terminal 10 generate a predetermined alarm sound.

The position information transmission/reception request reception unit 223 is a portion to receive GPS information transmission request information or GPS information reception request information from a mobile terminal 10. When the GPS information transmission request information is received from the mobile terminal 10A, for example, the position information transmission/reception request reception unit 223 receives the GPS information, which is transmitted from the mobile terminal 10A along with the GPS transmission request information, and outputs the information to the position information transmission unit 225. When the GPS information reception request information is received from the mobile terminal 10A, for example, the position information transmission/reception request reception unit 223 outputs the GPS information reception request information to the position information acquisition unit 224.

The position information acquisition unit 224 is a portion to acquire GPS information from a mobile terminal 10. When the GPS information reception request information is received from the position information transmission/reception request reception unit 223, the position information acquisition unit 224 transmits the GPS information reception request information to the mobile terminal 10B and 10C, which are communicating with the mobile terminal 10A, respectively. Then [the position information acquisition unit 224] receives the GPS information transmitted from the mobile terminals 10B and 10C, and outputs the GPS information to the position information transmission unit 225. The position information transmission unit 225 transmits the received GPS information to the mobile terminal 10A.

Now operation of the communication control system 1 having the above mentioned configuration will be described.

Figure 7:
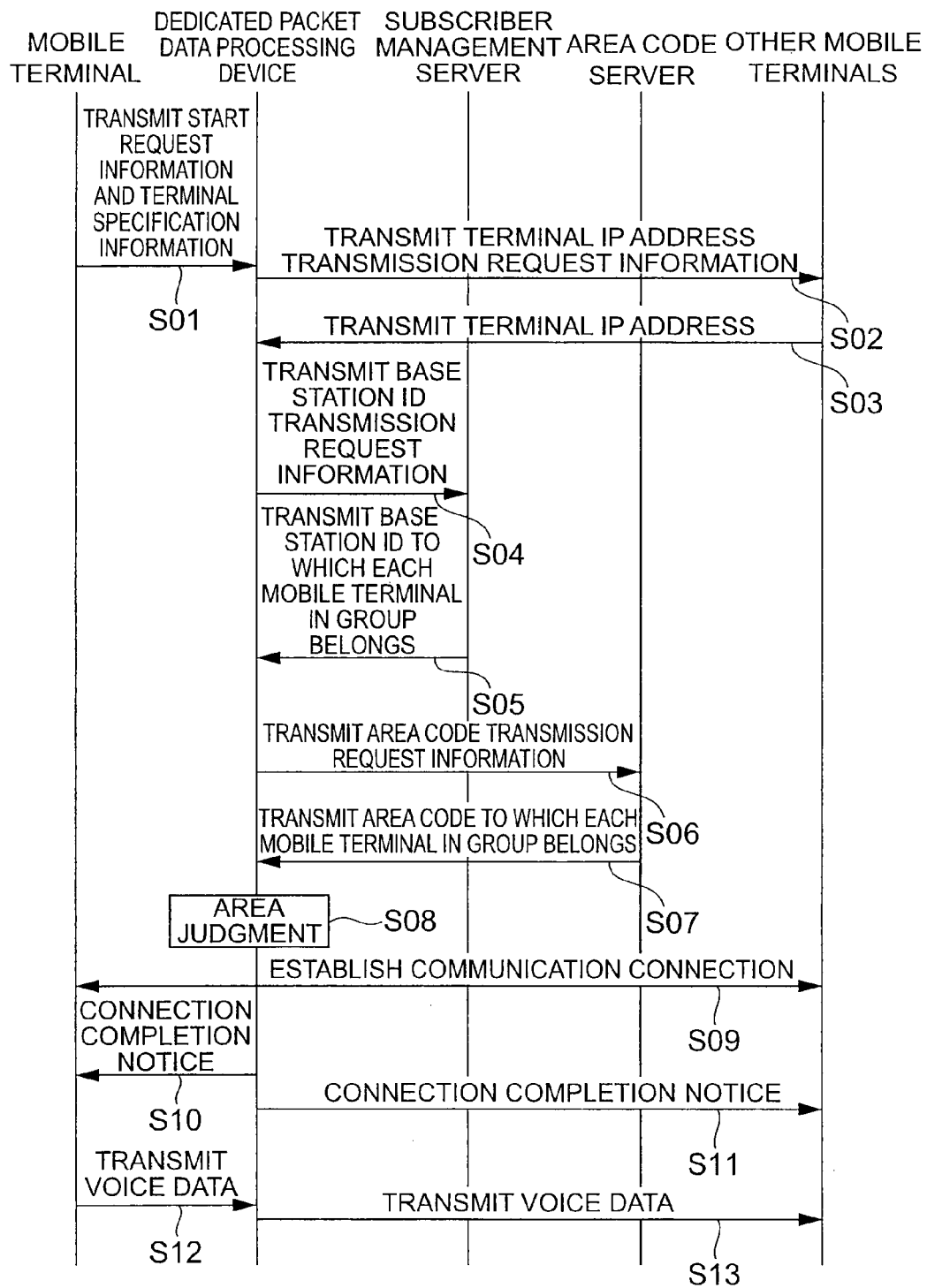
FIG. 7 is a sequence diagram depicting an operation of the communication control system shown in FIG. 2.

First the operation up to 1 to N communication between mobile terminals 10 and 10 will be described with reference to FIG. 7. As FIG. 7 shows, when a user desires communication with users belonging to a pre-registered group, the start request information and the terminal specification information on the mobile terminals 10B to 10D belonging to the selected group are transmitted from the mobile terminal 10A to the dedicated packet data processing device 20 via a predetermined operation by this user (step S01).

Then the dedicated packet data processing device 20, which receives the start request information and the terminal specification information, transmits the terminal IP address transmission request information to the mobile terminals 10B to 10D (step S02), and corresponding to this information, the mobile terminals 10B to 10D transmit each terminal IP address to the dedicated packet data processing device 20 (step S03). After transmitting the terminal IP addresses, the dedicated packet data processing device 20 transmits the base station ID transmission request information to the subscriber management server 30 (step S04). Then the subscriber management server 30 transmits the base station ID of a base station, where each mobile terminal 10A to 10D is located, to the dedicated packet data processing device 20 (step S05).

After receiving the base station ID, the dedicated packet data processing device 20 transmits the area code transmission request information and the base station ID to the area code server 40 (step S06). In response to this, the area code server 40 transmits an area code corresponding to the received base station ID to the dedicated packet processing device 20 (step S07).

Then the dedicated packet data processing device 20 creates the judgment table 51 in which the area code, terminal IP address and terminal specification information are correlated (see FIG. 5). Referring to the created judgment table, the dedicated packet data processing device 20 judges whether an area code matching the area code of the mobile terminal 10A exists (step S08). Then the dedicated packet data processing device 20 establishes the communication connection between the mobile terminal 10A and the mobile terminals 10B and 10C having an area code matching with the area code of the mobile terminal 10A (step S09).

After the communication connection is established, the dedicated packet data processing device 20 sends a connection completion notice to the mobile terminal 10A (step S10, step S11). Then if the user inputs voice in the mobile terminal 10A, for example, which acquired the speech right, the mobile terminal 10A transmits voice data to the dedicated packet data processing device 20 (step S12), and the dedicated packet data processing device 20 transmits voice data to the other mobile terminals 10B and 10C (step S13).

Now the operation when 1 to N communication is being performed between mobile terminals 10 and 10 will be described with reference to FIG. 8.

Figure 8:
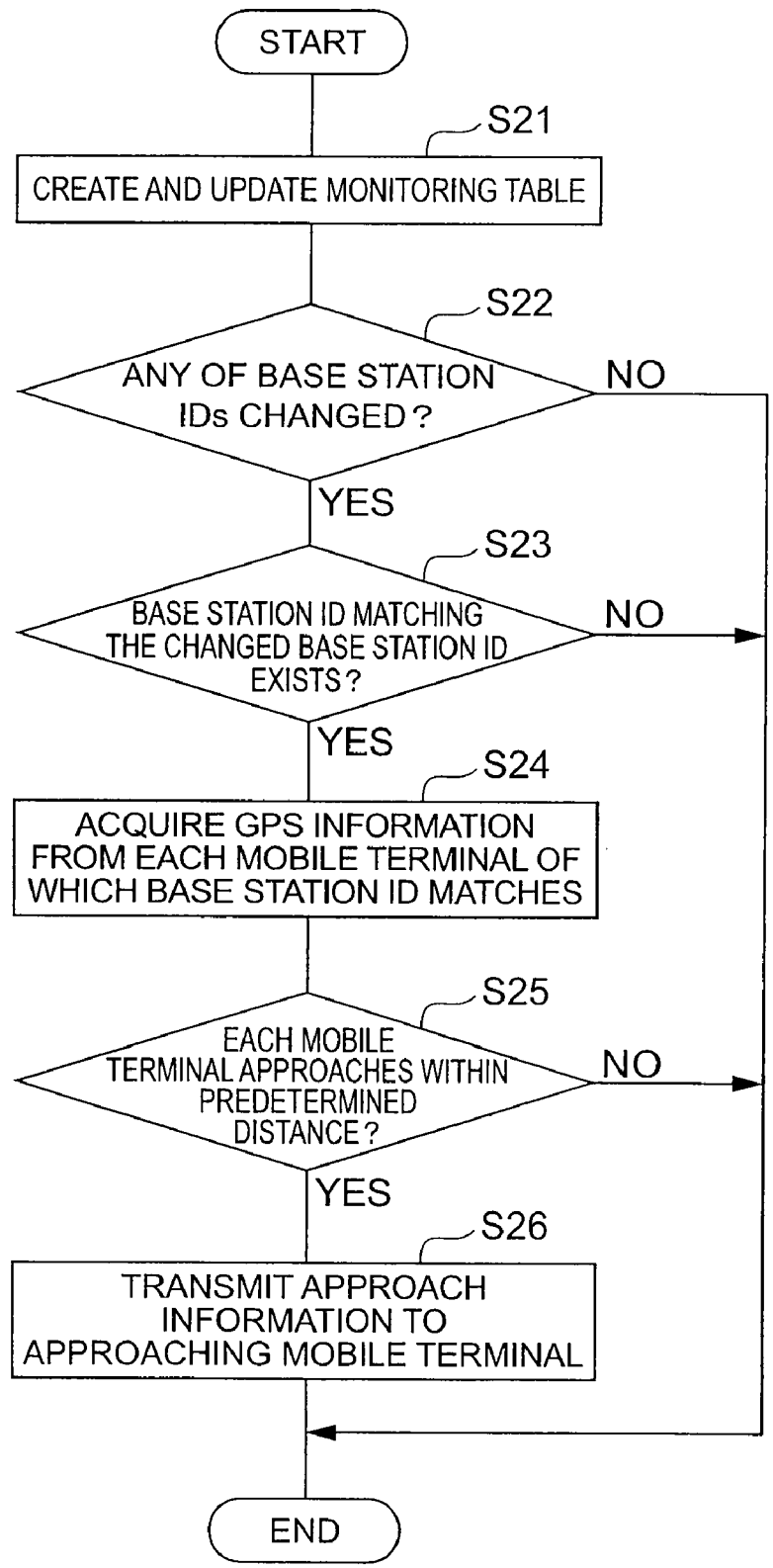
FIG. 8 is a flow chart depicting an operation of the dedicated packet data processing device after the communication connection is established.

As FIG. 8 shows, after communication connection between the mobile terminal 10A and mobile terminals 10B and 10C is established, the dedicated packet data processing device 20 transmits the terminal specification information on each mobile terminal 10A to 10C during communication to the subscriber management server 30. Then [the dedicated packet data processing device 20] receives the base station ID which is transmitted from the subscriber management server 30, and creates the monitoring table in which the base station IDs and the terminal names are correlated (step S21). This processing is repeatedly performed every several seconds, for example, and the monitoring table is updated every time.

When the monitoring table is updated, the dedicated packet data processing device 20 judges whether a base station ID of any mobile terminal 10, out of each mobile terminal 10A to 10C during communication, has been changed (step S22). If no base station IDs have been changed, [this step] ends without performing any special processing. But if base station IDs have been changed, then it is judged whether a base station ID which matches with the changed base station ID exists in the monitoring table (step S23). If the base station ID matching the changed base station ID does not exist in the monitoring table, [this step] ends without performing any special processing.

If the base station ID matching the changed base station ID exists in the monitoring table, on the other hand, the dedicated packet data processing device 20 transmits the GPS transmission request information to the mobile terminals 10A and 10B, for example, with which the base station ID match, and acquires the GPS information on the mobile terminals 10A and 10B respectively (step S24). Based on the acquired GPS information, [the dedicated packet data processing device 20] judges whether the current positions of the mobile terminals 10A and 10B are mutually approached within a predetermined distance (e.g. 50 m) (step S25). If the current positions of the mobile terminals 10A and 10B are distant for more than a predetermined distance, [this step] ends without performing any special processing. If the distance between the current positions of the mobile terminals 10A and 10B is a predetermined distance or less, then [the dedicated packet data processing device 20] transmits the approach information to the mobile terminals 10A and 10B (step S26).

Now operation performed when GPS information is exchanged between the mobile terminals 10 and 10 during communication will be described with reference to FIG. 9 and FIG. 10.

Figure 9:
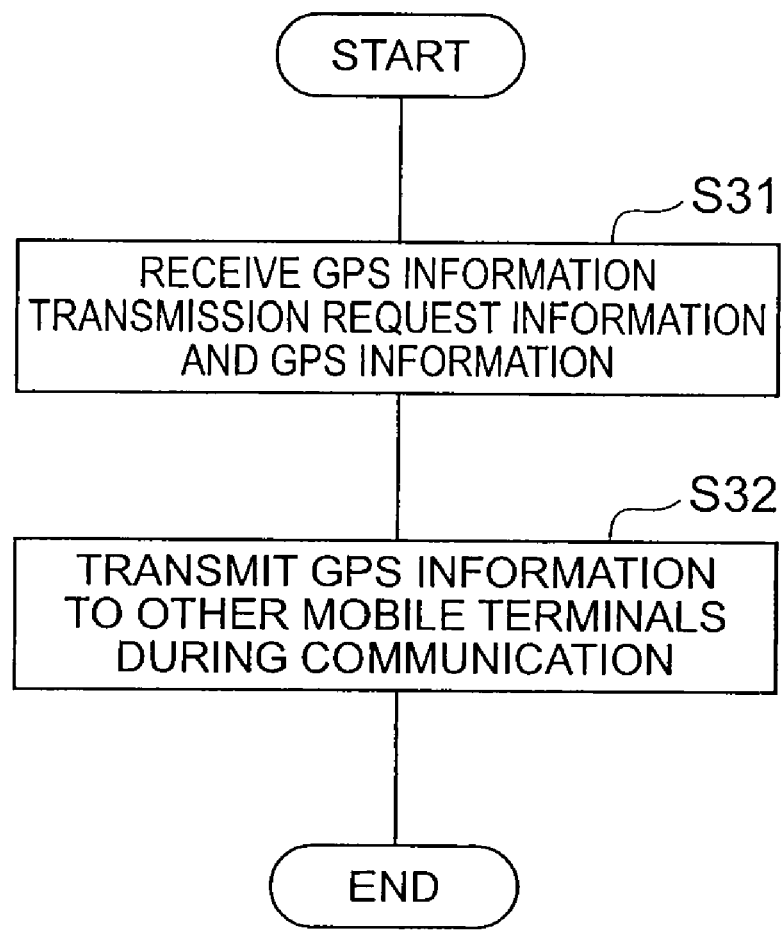
FIG. 9 is a flow chart depicting an operation of the dedicated packet data processing device when GPS information of one mobile terminal is transmitted to other mobile terminals.
Figure 10:
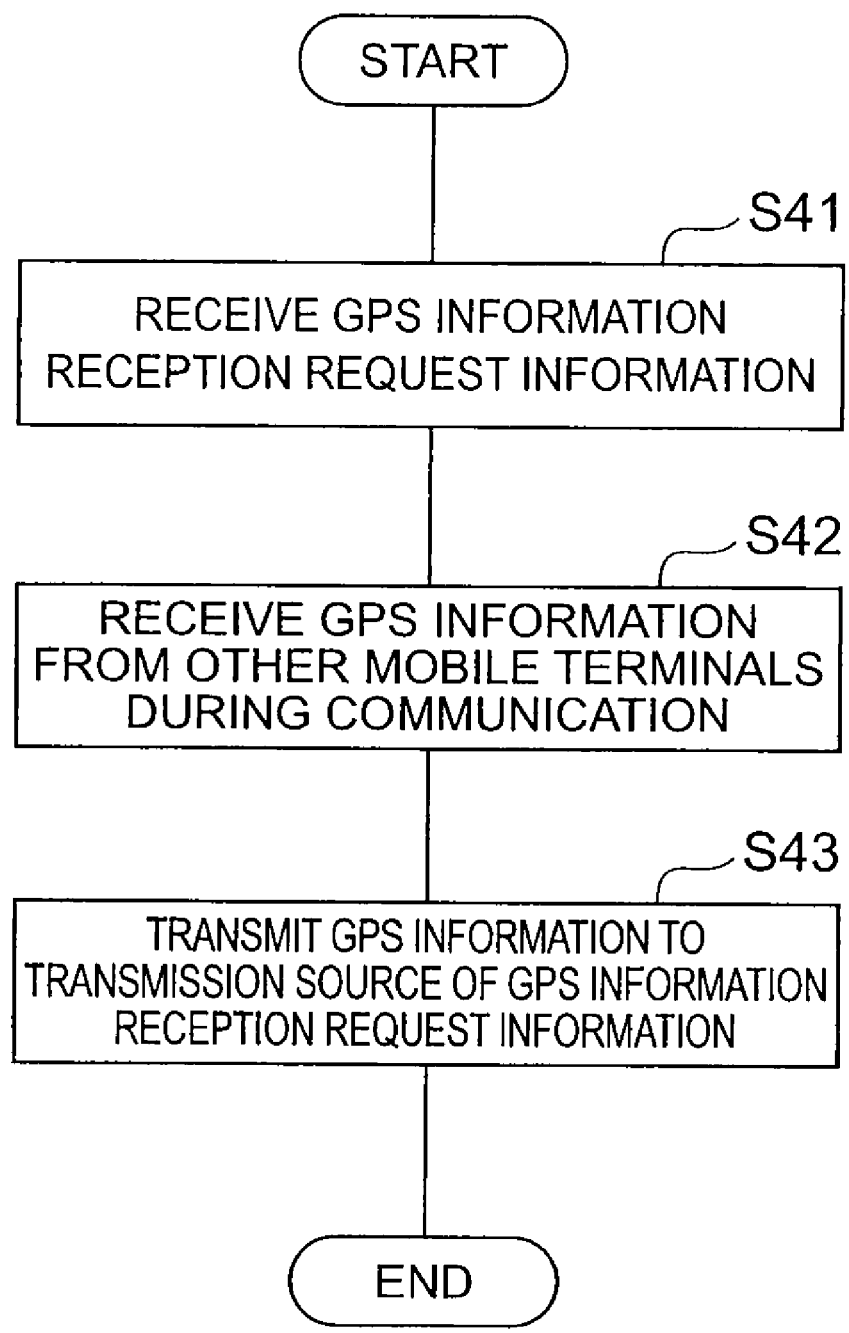
FIG. 10 is a flow chart depicting an operation of the dedicated packet data processing device when GPS information of another mobile terminal is sent to the one mobile terminal.

As FIG. 9 shows, when the GPS information transmission request information and GPS information are received from the mobile terminal 10A, for example (step S31), the dedicated packet data processing device 20 transmits the GPS information to the other mobile terminals 10B and 10C communicating with the mobile terminal 10A (step S32). Also as FIG. 10 shows, when the GPS information reception request information is received from the mobile terminal 10A (step S41), the dedicated packet data processing device 20 receives the GPS information from the other mobile terminals 10B and 10C respectively (step S42). Then [the dedicated packet data processing device 20] transmits the received GPS information to the mobile terminal 10A (step S43).

As described above, when the start request information is received from the mobile terminal 10A, the communication control system 1 judges whether the area code of the mobile terminal 10A and the area codes of the other mobile terminals 10B to 10D in the group match, and establishes 1 to N communication between the mobile terminal 10A and the mobile terminals 10B and 10C, of which area codes match. By this, the communication control system 1 does not indiscriminately connect the mobile terminal of a user who is at a distant location and for whom it is difficult to travel to a meeting, and therefore unnecessary communication connection can be prevented. A communication destination mobile terminal 10 is automatically selected based on the area code, so user-friendliness can be sufficiently ensured.

Also the communication control system 1 monitors the base station IDs where the mobile terminals 10A to 10D during communication locate at a predetermined cycle, and if the current positions of the mobile terminals 10A and 10B, for example, mutually approach within a predetermined distance, [the communication control system 1] transmits the approach information to the mobile terminals 10A and 10B. Therefore, in the case of the above mentioned meeting, the user can intuitively recognize an approach with other users during communication, and therefore the convenience of the communication service can be improved.

Furthermore, in the communication control system 1, the mobile terminals 10 and 10 during communication can exchange the GPS information which shows the latitude and longitude of the current positions. Hence the user can notify its current position to other users during communication, and know the current positions of the other users during communication, and therefore the convenience of the communication service can be improved. In this case, a map server (not illustrated) to transmit map information to the mobile terminals 10 based on the GPS information, for example, may be installed in the communication control system 1.

The present invention is not limited to the above embodiment. For example, according to the above embodiment, a communication connection is started between the mobile terminal 10, which transmitted the start request information to the dedicated packet data processing device 20, and other mobile terminals 10, of which area codes match, but it may be judged whether another mobile terminal 10 is located within a predetermined area based on the base station ID or GPS information, instead of the area code. If the GPS information is used, an area having a predetermined radius with the mobile terminal 10, which transmitted the start request information to the dedicated packet data processing device 20 as the center, may be set as a predetermined area.

Specified position information reception means (not illustrated) to receive specified position information (e.g. information to indicate an address of an arbitrary target object) which indicates a position is specified by the user of the mobile terminal 10, from the mobile terminal 10, may be additionally installed in the dedicated packet data processing device 20, so as to receive the specified position information along with the start request information. In this case, an area code corresponding to the specified position may be acquired from the area code server 40, so as to establish the communication connection with a mobile terminal 10 having an area code matching the acquired area code, or an area, having a predetermined radius with a specified position as the center, may be set as a predetermined area, instead of using an area code, so that a communication connection is established with mobile terminals 10 existing within this predetermined area. According to this configuration, the user who starts a communication connection can select an arbitrary location as the predetermined area, so flexibility in selecting communication destination mobile terminals increases, and convenience in the communication service can be improved.

The invention claimed is:

1. A communication control system for controlling simultaneous communication among a plurality of mobile terminals belonging to a pre-registered group, the system comprising:

position information storage means for storing position information which indicates a current position of each of said mobile terminals from said pre-registered group;

start request information reception means for receiving start request information to request the start of a communication connection from one mobile terminal of said pre-registered group;

area judgment means for judging whether each other mobile terminal of said pre-registered group that did not initiate the start request information are located within a predetermined area in which the mobile terminal that initiated the start request information is located by referring to said position information stored in said position information storage means when said start request information reception means receives said start request information, the predetermined area defined by an area code associated with a plurality of base stations and an area which is set with a position specified by a user of said one mobile terminal as a center, and each mobile terminal that is in communication with a base station included in the plurality of base stations associated with the area code judged to be located in the predetermined area;

connection control means for establishing a communication connection between said mobile terminal of said pre-registered group that initiated the start request information and each other of said mobile terminals of said pre-registered group that did not initiate the start request information which have been judged as being located within said predetermined area by said area judgment means; and position information monitoring means for monitoring, during said communication, position information of each of said mobile terminals participating in said communication and judging whether a current position of each of said mobile terminal participating in said communication mutually approaches within a predetermined distance upon indication that a base station ID associated with any one of said mobile terminals participating in said communication has changed.

2. The communication control system according to claim 1, further comprising:

approach information transmission means for transmitting approach information to notify the mutual approach of the current position to a mobile terminal for which said position information monitoring means has judged that the current position has mutually approached within said predetermined distance.

3. The communication control system according to claim 1, further comprising:

transmission request information reception means for receiving, during said communication from said mobile terminal that initiated the start request information, transmission request information to request the transmission of position information of one mobile terminal participating in said communication to each other of said mobile terminals participating in said communication; and position information transmission means for transmitting the position information of said one mobile terminal participating in said communication to each other of said mobile terminals participating in said communication when said transmission request information reception means receives said transmission request information.

4. The communication control system according to claim 1, further comprising:

receive request information reception means for receiving, during said communication from said mobile terminal that initiated the start request information, receive request information to request the reception of position information of each other of said mobile terminals participating in said communication; and position information transmission means for transmitting the position information of each other of said mobile terminals participating in said communication to said mobile terminal that initiated the start request information when said receive request information reception means receives said receive request information.

5. The communication control system according to claim 1, further comprising:
display means for displaying, during said communication on said mobile terminal that initiated the start request information, a position of each other of said mobile terminals participating in said communication relative to said mobile terminal that initiated the start request information.

6. A communication control system for controlling simultaneous communication among a plurality of mobile terminals belonging to a pre-registered group, the system comprising:
a position information storage device to store position information which indicates a current position of each of said mobile terminals from said pre-registered group;
a start request information reception device to receive start request information to request the start of a communication connection from one mobile terminal of said pre-registered group;
an area judgment device to judge whether each other mobile terminal of said pre-registered group that did not initiate the start request information are located within a predetermined area in which the mobile terminal that initiated the start request information is located by referring to said position information stored in said position information storage device when said start request information reception device receives said start request information,
the predetermined area defined by an area code associated with a plurality of base stations and an area which is set with a position specified by a user of said one mobile terminal as a center, and
each mobile terminal that is in communication with a base station included in the plurality of base stations associated with the area code judged to be located in the predetermined area;
a connection control device to establish a communication connection between said mobile terminal of said pre-registered group that initiated the start request information and each other of said mobile terminals of said pre-registered group that did not initiate the start request information which have been judged as being located within said predetermined area by said area judgment device; and
a position information monitoring device to monitor, during said communication, position information of each of said mobile terminals participating in said communication and judging whether a current position of each of said mobile terminal participating in said communication mutually approaches within a predetermined distance upon indication that a base station ID associated with any one of said mobile terminals participating in said communication has changed.

7. The communication control system according to claim 6, further comprising:
an approach information transmission device to transmit approach information to notify the mutual approach of the current position to a mobile terminal for which said position information monitoring device has judged that the current position has mutually approached within said predetermined distance.

8. The communication control system according to claim 6, further comprising:
a transmission request information reception device to receive, during said communication from said mobile terminal that initiated the start request information, transmission request information to request the transmission of position information of one mobile terminal participating in said communication to each other of said mobile terminals participating in said communication; and
a position information transmission device to transmit the position information of said one mobile terminal participating in said communication to each other of said mobile terminals participating in said communication when said transmission request information reception device receives said transmission request information.

9. The communication control system according to claim 6, further comprising:
a receive request information reception device to receive, during said communication from said mobile terminal that initiated the start request information, receive request information to request the reception of position information of each other of said mobile terminals participating in said communication; and
a position information transmission device to transmit the position information of each other of said mobile terminals participating in said communication to said mobile terminal that initiated the start request information when said receive request information reception means receives said receive request information.

10. The communication control system according to claim 6, further comprising:
a display device to display, during said communication on said mobile terminal that initiated the start request information, a position of each other of said mobile terminals participating in said communication relative to said mobile terminal that initiated the start request information.

* * * * *